United States Patent Office 3,383,366
Patented May 14, 1968

3,383,366
POLYESTER-URETHANE-UREA
POLYMER FIBERS
Bernard Taub, Williamsville, N.Y., assignor to Allied
Chemical Corporation, New York, N.Y., a corporation
of New York
No Drawing. Filed Nov. 10, 1964, Ser. No. 410,257
6 Claims. (Cl. 260—75)

ABSTRACT OF THE DISCLOSURE

Production of elastic fibers or filaments having superior color stability to ultra-violet light and good elastic recovery by (1) reacting a hydroxyl-terminated polyester with a molar insufficiency of an aromatic diisocyanate to produce a hydroxyl terminated polyester containing urethane groups, (2) reacting said hydroxyl terminated polyester containing urethane groups with an aliphatic diisocyante to obtain an isocyanate terminated prepolymer, (3) reacting said isocyanate terminated prepolymer with a specified chain-extending agent, p-methane-1,8-diamine, to form a polyester-urethane-urea copolymer, and (4) extruding the copolymer. Chain-extension preferably is effected in the presence of an organic solvent to produce a storage stable solution from which said superior elastic fibers may be obtained by conventional procedures, e.g. by extrusion into water or dry spinning.

---

This invention relates to elastic fibers or filaments prepared from linear, segmented polymers comprising urea segments linked to polyester segments through urethane groups, such elastic fibers being non-yellowing and resistant to chlorine bleaches.

Synthetic and natural polymers capable of being shaped into articles having elastic properties are well known; such products suffer, in general, from one or more deficiencies, such as unsuitability for spinning into elastic fibers, relatively low sticking temperatures, poor hydrolytic stability, and poor color stability to light, especially ultraviolet light. Until recently elastic filaments in the textile field have been produced from natural rubber. Most rubber fibers that are used in textile applications are narrow strips of film that have been cut from sheet rubber. Rubber fibers, currently, utilized in textiles have several disadvantages such as poor abrasion resistance at finer denier and poor durability in ultraviolet light. Many synthetic rubbers have been developed in recent years. Of these, polyurethane rubbers based on linear polyesters and linear polyethers have become well known.

Typical polyester urethane rubbers are described in articles by O. Bayer (Rubber Chemistry, 23, 812–835, 1950) and E. Muller (Rubber Chemistry, 26, 493–509, 1953) under the name of "Vulcollan." These rubbers are prepared by reacting an isocyanate-modified polyester with a suitable chain-extender, e.g., a diamine, to produce a linear polyester-urethane urea intermediate which is then crosslinked or "cured" to produce the final "Vulcollan" product. Typical "Vulcollans" are produced by the processes of U.S. Patents 2,620,516 and 2,621,166. W. Brenschede U.S. 2,755,266 teaches the preparation of elastic fibers from solutions of the "Vulcollan" products; in general, the fibers so obtained from aromatic diisocyanates possess good elastic properties but yellow on exposure to ultra-violet light. This yellowing can be overcome by the use of aliphatic diisocyanates, as is known in coating and film technology. However, the substitution of the aromatic diisocyanate by aliphatic diisocyanate results in deterioration of the physical properties of the elastic fiber e.g., diminished stretch resistance, decreased elastic recovery from hot water elongation, etc.

An object of this invention is to provide new synthetic linear segmented polyester-urethane-urea polymers which are soluble in organic solvents and are suitable for spinning into elastic fibers. Another object is to provide elastic fibers composed of segmented polyester-urethane-ureas which have excellent color stability to ultraviolet light.

These objects are attained by the provision of an elastic fiber having superior color stability to ultraviolet light and good elastic recovery and comprising a segmented substantially linear polyester-urethane-urea polymer. The polymer is prepared by reacting a difunctional hydroxyl-terminated linear polyester with an aromatic diisocyanate to produce a hydroxyl terminated polyester containing urethane groups; this product is further reacted with an aliphatic diisocyanate to obtain an isocyanate terminated intermediate. The isocyanate terminated prepolymer is then admixed with a specific chain-extending agent, p-menthane-1,8-diamine, to form the polyester-urethane-urea copolymer. Chain-extension preferably can take place in an organic solvent such as dimethylformamide to produce a storage stable solution from which superior elastic fibers are obtained by extrusion into water or dry spinning. Solutions of these polyester-urethane-urea copolymers do not gel in a short period of time, so that there is little restriction on the working life of the solution. Further, the elastic fibers produced from these copolymers do not hydrolyze or deteriorate when under tension in boiling water.

Difunctional hydroxyl-terminated polyesters are used in the practice of this invention. A general discussion of the polyesters contemplated appears in Saunders et al. Polyurethanes: Chemistry and Technology, Part I. Chemistry, High Polymers, volume XVI, Interscience Publishers, New York, 1962, pp. 44–48 and 273–293. Organic acids, esters, acid halides, and glycols, which can be aliphatic, cycloaliphatic, or aromatic compounds, can be used to prepare the polyesters. Suitable organic acids are malonic acid, succinic acid, terephthalic acid, adipic acid, methyladipic acid, maleic acid, sebacic acid, suberic acid, and the esters and acid halides thereof.

Suitable glycols are ethylene glycol, 1,2-propanediol, 1,3-propanediol, 1,3-butanediol, tetramethylene glycol, 1,6-hexanediol, 1,4-butanediol, diethylene glycol, 2,2-dimethyl-1,3-propanediol, decamethylene glycol, and substituted polymethylene glycols. The suggested number of carbon atoms in the acids, esters, acid halides, and glycols is from 2 to 20 and preferably from 2 to 10. The suggested molecular weight range of the polyester is from 1500 to 2500 and preferably from 1700 to 2200. The term "difunctional hydroxyl-terminated" is defined to mean that the polyester consists essentially of molecules with a terminal OH group on each end. Particularly preferred polyesters are poly(ethylene) adipates and poly(ethylenepropylene) adipates having a molecular weight from about 1700 to about 2100.

The organic diisocyanate employed in the preparation of the hydroxyl terminated polyester containing urethane groups is an aromatic diisocyanate preferably a symmetrical aromatic diisocyanate such as 4,4'-methylene bis-(phenylisocyanate) and 4,4'-methylene bis(3-methylphenylisocyanate) though an unsymmetrical diisocyanate such as toluene diisocyanate or m-phenylene diisocyanate can be used. The polyester-urethane so obtained preferably has a molecular weight of less than 5000 and is then reacted with an aliphatic, preferably a cycloaliphatic, diisocyanate. Suitable compounds include tetramethylene diisocyanate, hexamethylene diisocyanate, 4,4'-methylene bis(cyclohexylisocyanate), cyclohexane - 1,4-diisocyanate and 1,4-cyclohexane bis(methyl isocyanate). The preferred cycloaliphatic diisocyanate for this second reaction with the hydroxyl terminated polyester is the solid or trans-trans isomer of 4,4'-methylene bis(cyclohexylisocyanate); the pure trans-trans isomer has a melting point of 80° C. The amount of diisocyanate used in the two stage polyesterisocyanate reaction is such that (1) in the first stage a molar insufficiency of diisocyanate is employed, i.e., the molar ratio of polyester to aromatic diisocyanate can be in the range of about 1.5:1 to about 2.5:1, preferably about 1.8:1 to about 2.2:1; (2) in the second stage the hydroxyl terminated polyester containing urethane groups is reacted with an excess of aliphatic diisocyanate to obtain an isocyanate terminated polyester urethane. The total amount of diisocyanate, i.e., aromatic and aliphatic diisocyanate, employed in the two stages in such that the ratio of total NCO groups to OH groups based on the initial polyester glycol, is in the range of about 1.7:1 to about 2.3:1, preferably in the range of 1.9:1 to 2.1:1. Lower ratios of total NCO groups to OH groups, such as can be utilized in my copending application Ser. No. 410,267 of even date, relating to polyether based elastic fibers, produce a crumbling fiber whereas higher ratios yield a non-elastic fiber. A ratio of total NCO:OH of 2.5:1 produces a copolymer that on chain-extension and extrusion yields stiff non-elastic fibers. In order to obtain a faster reaction, the second stage can be carried out in the presence of well-known organo-tin catalysts such as dibutyltin dilaurate or stannous octoate.

An amine chain-extending agent is employed to prepare the polyester-urethane-urea copolymer for spinning into fibers. The isocyanate terminated polyester-urethane can be dissolved in a suitable organic solvent, preferably dimethylformamide, and a solution of the amine in the same solvent can then be added with stirring to produce a chain-extended polyester - urethane-urea. Elastic fibers are obtained by extrusion of the solution of the polymer into a hot water bath. Other organic solvents which can be used are dimethylacetamide, dimethylpropionamide, dimethylsulfoxide, and tetramethyl urea.

The first and second stages of the process can be conducted at temperatures above room temperature (about 70° C. to 120° C); however, about 100° C., is preferred. Admixing the intermediate with the amine chain-extending agent can take place at temperatures of about 0° C. to about 25° C., preferably about 5° C. to 10° C. After extrusion into hot water (about 70° C. to less than about 100° C.), the elastic fibers can be cured in the conventional manner. Curing temperatures of about 100° C. to 150° C. can be used along with times of about 2 to about 8 hours.

The more detailed practice of the invention is illustrated by the following examples, in which parts given are by weight. It is not intended that the scope of the invention should be limited by these specific examples.

EXAMPLE I

A hydroxyl terminated substantially linear polyester (average molecular weight 2080) was obtained by the esterification of adipic acid with a mixture of ethylene glycol (80%) and propylene glycol (20%). A mixture of 93.6 parts (0.045 mol) of this polyester and 5.64 parts (0.0225 mol) of 4,4'-methylene bis(phenylisocyanate) was heated under anhydrous conditions for one hour at 100° C. To the hot reaction mixture there was added 17.7 parts (0.0675 mol) of solid 4,4'-methylene bis(cyclohexylisocyanate) and a small amount (2 drops) of dibutyl tin dilaurate; heating at 100° C. was continued for an additional hour to produce an isocyanate-terminated intermediate having an NCO content of 2.46%.

A solution of 100 parts of intermediate dissolved in 250 parts of dimethylformamide was cooled to 5° C. before addition of a solution of 4.98 parts of p-methane-1,8-diamine in 50 parts of dimethylformamide. The mixture was agitated at below 10° C. for a quarter hour and agitation was continued at room temperature (about 25° C.) for two hours. The resulting viscous solution was extruded into hot (80° C.) water and the fibers were taken up at a speed of about 20 to 30 feet per minute. The fibers were cured by heating at 120° C. for about 4 hours. The cured fibers were 357 denier (fused multifilament) with the following tensile properties: elongation 669%, 0.75 g./d. tensile strength, a stretch-resistance of 0.022 g./d. at 50% stress and 0.032 g./d. at 100% stress. Hot (90° C.) water elastic recovery was 70% (percentage return to original length within one minute after the tension has been released from a fiber sample which has been elongated 50% and immersed in 90° C. water for one minute). The fibers did not yellow and the properties did not deteriorate when exposed to ultraviolet light and chlorine bleach.

EXAMPLE II

A mixture of 97.65 parts (0.0525 mol) of poly (ethylene adipate) (average molecular weight 1860) and 6.58 parts (0.262 mol) of 4,4'-methylene bis(phenylisocyanate) was heated at 100° C. for one hour under anhydrous conditions. To the hot mixture there was added 20.65 parts (0.0788 mol) of solid 4,4'-methylene bis(cyclohexylisocyanate) and a small amount (2 drops) of dibutyl tin dilaurate; heating at 100° C. was continued for an hour. The resulting isocyanate terminated intermediate had an NCO content of 3.00%.

The intermediate (100 parts), in dimethylformamide (250 parts) solution, was chain-extended with 6.07 parts of p-menthane-1,8-diamine (dissolved in 50 parts of dimethylformamide) at about 5° C. as in Example I above. Extrusion of the solution of chain-extended polymer into hot (80° C.) water yielded non-yellowing filaments having a hot water elastic recovery of about 69%. Curing of the polymer at 120° C. for two hours resulted in hot water elastic recovery of 70%. The fibers did not yellow and the properties did not deteriorate when exposed to ultraviolet light and chlorine bleach.

EXAMPLE III

The polyester of Example I above was reacted with 4,4'-methylene bis(phenylisocyanate) and the liquid (isomeric mixture) 4,4'-methylene bis(cyclohexylisocyanate) in the presence of dibutyl tin dilaurate in the proportions employed in Example I to yield an isocyanate-terminated intermediate having an NCO content of 2.35%. Chain-extension with p-methane-1,8-diamine dissolved in dimethylformamide as in Example I and extrusion into hot water yielded fibers, after curing at 120° C. for 4 hours, having the following properties: denier 596; elongation 818%; tensile strength 0.54 g./d.; stretch-resistance 0.012 g./d. at 50% stress and 0.02 g./d. at 100% stress; shrinkage 1.8%.

EXAMPLE IV

An isocyanate-terminated prepolymer having an NCO content of 2.7% was prepared from poly(ethylenepropylene adipate) by a two stage addition of organic diisocyanate in a manner similar to that described in Example I, using 4,4'-methylene bis(phenylisocyanate) in the first stage to yield a hydroxyl terminated polyester containing urethane groups and reacting the latter in the second stage with 4,4'-methylene bis(cyclohexylisocyanate) in the presence of dibutyltin dilaurate. The intermediate thus obtained was dissolved in dimethylformamide; the resulting solution was divided into eight equal portions and the prepolymer was chain-extended with various agents. The table below indicates the superiority of p-menthane-1, 8-diamine as the chain-extending agent for the intermediate.

TABLE

| Chain Extender | Solution and Polymer Characteristics |
|---|---|
| 1,4-cyclohexane bis (methylamine) | Solution gels in 3 hours. |
| 2,5-dimethyl-piperazine | Solution gels in 2 hours. |
| Ethylene diamine | Solution gels in less than ½ hour. |
| 1,3-propanediamine | Do. |
| Hydrazine hydrate | Solution is storage stable but the elastomeric fiber and film deteriorate, under tension, in hot water. |
| p-Menthane-1,8-diamine | Solution is storage stable in excess of two months. Fibers do not deteriorate, under tension in hot water. |

NOTE.—Acceptable gel time for commercial use: a minimum of about three days.

My copending application Ser. No. 410,267, of even date, relates to segmented substantially linear polyether-urethane urea copolymers and fibers and films prepared therefrom.

I claim:
1. A segmented substantially linear polyester-urethane-urea copolymer prepared by a process comprising the following steps:
   (a) heating a difunctional hydroxyl-terminated polyester with an aromatic diisocyanate in a molar ratio of about 1.5:1 to about 2.5:1 to produce a hydroxyl-terminated polyester-urethane;
   (b) heating the hydroxyl-terminated polyester urethane with an aliphatic diisocyanate to produce an isocyanate-terminated intermediate; and
   (c) admixing the isocyanate-terminated intermediate with p-menthane-1,8-diamine to produce the copolymer.

2. The copolymer as defined in claim 1 wherein the aliphatic diisocyanate is a cycloaliphatic diisocyanate.

3. The copolymer as defined in claim 2 wherein the cycloaliphatic diisocyanate is 4,4'-methylene bis(cyclohexylisocyanate).

4. An elastic fiber prepared by a process comprising the following steps:
   (a) heating a difunctional hydroxyl-terminated polyester with an aromatic diisocyanate in a molar ratio of about 1.5:1 to about 2.5:1 to produce a hydroxyl-terminated polyester-urethane;
   (b) heating the hydroxyl-terminated polyester urethane with an aliphatic diisocyanate to produce an isocyanate-terminated intermediate;
   (c) admixing the isocyanate-terminated intermediate with p-menthane-1,8-diamine to produce a segmented substantially linear polyester-urethane-urea copolymer; and
   (d) extruding the copolymer.

5. The elastic fiber as defined in claim 4 wherein the aliphatic diisocyanate is a cycloaliphatic diisocyanate.

6. The elastic fiber as defined in claim 5 wherein the cycloaliphatic diisocyanate is 4,4'-methylene bis(cyclohexylisocyanate).

References Cited

UNITED STATES PATENTS

| 2,929,804 | 3/1960 | Steuber | 260—77.5 |
| 3,105,062 | 9/1963 | Graham et al. | 260—75 |
| 3,097,192 | 7/1963 | Schilit | 260—77.5 |
| 3,180,854 | 4/1965 | Schneider et al. | 260—75 |
| 3,249,576 | 5/1966 | Phelisse et al. | 260—75 |

OTHER REFERENCES

Britain et al., Journal of Applied Polymer Science, vol. IV, Issue No. 11, pp. 207–211 (1960).

Hampton et al., Oil and Color Chemists Association Journal, vol. 43, No. 2, February 1960, pp. 96, 110 and 111.

DONALD E. CZAJA, *Primary Examiner.*

M. I. MARQUIS, *Assistant Examiner.*